(12) United States Patent
Yamada et al.

(10) Patent No.: US 9,470,131 B2
(45) Date of Patent: Oct. 18, 2016

(54) HONEYCOMB STRUCTURE

(71) Applicant: NGK Insulators, Ltd., Nagoya (JP)

(72) Inventors: Toshio Yamada, Nagoya (JP); Hidetoshi Yanase, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 297 days.

(21) Appl. No.: 14/215,603

(22) Filed: Mar. 17, 2014

(65) Prior Publication Data
US 2014/0287191 A1 Sep. 25, 2014

(30) Foreign Application Priority Data

Mar. 22, 2013 (JP) ................. 2013-060618

(51) Int. Cl.
| | | |
|---|---|---|
| *F01N 3/022* | (2006.01) | |
| *B01D 46/24* | (2006.01) | |
| *F01N 3/28* | (2006.01) | |
| *B32B 3/12* | (2006.01) | |
| *C04B 38/00* | (2006.01) | |
| *C04B 111/00* | (2006.01) | |

(52) U.S. Cl.
CPC ......... *F01N 3/2828* (2013.01); *B01D 46/2455* (2013.01); *B32B 3/12* (2013.01); *C04B 38/0016* (2013.01); *B01D 46/2459* (2013.01); *C04B 2111/00793* (2013.01); *F01N 3/0222* (2013.01); *F01N 2330/30* (2013.01); *Y10T 428/24149* (2015.01); *Y10T 428/24157* (2015.01)

(58) Field of Classification Search
None
See application file for complete search history.

(56) References Cited

U.S. PATENT DOCUMENTS

| | | | |
|---|---|---|---|
| 5,709,722 A * | 1/1998 | Nagai | B01D 46/2455 55/524 |
| 5,961,931 A | 10/1999 | Ban et al. | |
| 6,258,436 B1 * | 7/2001 | Pajonk | F01N 3/2828 422/180 |
| 6,596,666 B1 | 7/2003 | Yamada | |
| 7,247,184 B2 * | 7/2007 | Frost | B01D 46/247 428/116 |
| 9,212,589 B2 * | 12/2015 | Nishio | F01N 3/2828 |
| 2002/0076523 A1 | 6/2002 | Ketcham et al. | |
| 2004/0161373 A1 * | 8/2004 | Ichikawa | B01D 46/0001 422/180 |
| 2005/0076627 A1 * | 4/2005 | Itou | B01D 46/2429 55/523 |
| 2005/0178098 A1 * | 8/2005 | Ono | F01N 3/2828 55/523 |

(Continued)

FOREIGN PATENT DOCUMENTS

| | | |
|---|---|---|
| DE | 695 14 608 T2 | 9/2000 |
| DE | 601 08 347 T2 | 3/2006 |

(Continued)

OTHER PUBLICATIONS

German Examination Report (Application No. 10 2014 003 835.1) dated Nov. 17, 2014 (with English translation).

*Primary Examiner* — David Sample
*Assistant Examiner* — Nicholas W Jordan
(74) *Attorney, Agent, or Firm* — Burr & Brown, PLLC

(57) ABSTRACT

In each honeycomb segment, a first and a second end surfaces are rectangular shapes having the same dimension, and are in a positional relation in which extending directions of long sides of the respective end surfaces are perpendicular to each other, and (X−Y)/2 is from 0.2 to 7 mm, where X is a length of each long side of each of the first and the second end surfaces, and Y is a length of each short side of each of the first and the second end surfaces. The honeycomb segment has two pairs of tapered side surfaces each of which including two side surfaces facing each other so that a distance between side surfaces becomes narrow from the first end surface toward the second end surface end, respectively.

14 Claims, 12 Drawing Sheets

(56) References Cited

U.S. PATENT DOCUMENTS

2008/0034744 A1* 2/2008 Bardon ............... F01N 3/0222
  96/9
2009/0246455 A1 10/2009 Mizutani
2011/0118486 A1* 5/2011 Dubois ............... B01J 8/006
  422/211

FOREIGN PATENT DOCUMENTS

| EP | 0 707 139 A1 | 4/1996 |
| EP | 1 217 185 A2 | 6/2002 |
| FR | 2 789 327 B1 | 4/2001 |
| JP | 2001-138416 A1 | 5/2001 |
| WO | 2008/096502 A1 | 8/2008 |

* cited by examiner

HONEYCOMB STRUCTURE

The present application is an application based on JP-2013-060618 filed on Mar. 22, 2013 with the Japanese Patent Office, the entire contents of which are incorporated herein by reference.

BACKGROUND OF THE INVENTION

1. Field of the Invention

The present invention relates to a honeycomb structure for use in a filter or the like to collect particulate matters included in an exhaust gas of a diesel engine or a gasoline engine.

2. Description of Related Art

In an exhaust gas of a diesel engine or a gasoline engine such as a gasoline direct injection (GDI) engine, a particulate matter (PM) is included. This PM is mainly composed of carbon fine particles such as soot, and it is recognized to be a carcinogen, so that it is necessary to prevent the PM from being discharged to the atmosphere, and hence strict emission regulations have been imposed thereon.

To cope with such strict emission regulations, a large number of investigations have been performed to decrease an amount of the PM emission, but there is a limit to the decrease of the amount of the PM emission by improvement of a burning technology, and at present, the disposing of a filter in an exhaust system is only one effective means for decreasing the amount of the PM emission.

As the filter for collecting the PM, a wall flow type filter using a honeycomb structure has broadly been used because a high PM collecting efficiency can be obtained while suppressing a pressure loss to an allowable range. The honeycomb structure for use in the wall flow type filter has porous partition walls to define and form a plurality of cells extending from an inlet end surface on an inlet side of the exhaust gas to an outlet end surface on an outlet side of the exhaust gas. In this honeycomb structure, plugging portions are disposed to plug open end portions on an outlet end surface side of predetermined cells and open end portions on an inlet end surface side of the remaining cells, whereby the filter having a high PM collecting efficiency can be obtained.

That is, in the honeycomb structure in which the plugging portions are disposed in this way, the exhaust gas which has flowed into the cells from the inlet end surface passes the partition walls, and then flows out of the cells from the outlet end surface. When the exhaust gas passes the partition walls, the partition walls function as filter layers, so that the PM included in the exhaust gas is collected.

Additionally, to continuously use such a filter for a long period of time, the filter needs to be periodically subjected to a regeneration treatment. That is, for the purpose of decreasing the pressure loss increased due to the PM deposited in the filter with an elapse of time to return a filter performance to an initial state, the PM deposited in the filter needs to be burned by a high-temperature gas and removed. Furthermore, during this regeneration, high heat stress is generated in the filter due to the burning heat of the PM, and hence the filter is damaged sometimes.

Heretofore, as a measure for preventing such damage on the filter, it has been suggested that the whole filter is not manufactured as one honeycomb structure, but a plurality of segments having a honeycomb form (honeycomb segments) are bonded to obtain the honeycomb structure for the filter. Specifically, the plurality of honeycomb segments are integrally bonded to one another by a bonding material which has a low elastic modulus and is easily deformed to obtain a segment structure, whereby the heat stress applied to the honeycomb structure during the regeneration is scattered and alleviated to intend enhancement of heat shock resisting properties.

When the honeycomb structure of such a segment structure is used, the filter having high thermal shock resistance properties can be obtained, but on the other hand, a new problem inherent in the honeycomb structure of the segment structure occurs. That is, in the filter in which the honeycomb structure of the segment structure is used, there is the problem that movement (shift) easily occurs in the honeycomb segments constituting the honeycomb structure due to vibration or a pressure of the exhaust gas (hereinafter referred to as an exhaust pressure) during the use of the filter.

As one of means for solving this problem, in Patent Document 1, it has been suggested that a flatness of an outer wall as a bonding surface of honeycomb segments is set to a specific value, thereby enhancing a bonding strength between the honeycomb segments. Furthermore, in Patent Document 2, it has been suggested that a honeycomb segment in which an area of an inlet side end surface is smaller than an area of an outlet side end surface is used, and a bonding width of a bonding material of the inlet side end surface is larger than a bonding width of the bonding material of the outlet side end surface, thereby heightening a structural strength.

[Patent Document 1] JP-A-2001-138416
[Patent Document 2] WO 2008/096502

SUMMARY OF THE INVENTION

However, there is a limit to enhancement of a bonding force between honeycomb segments by means suggested in Patent Documents 1 and 2, and it has been difficult to obtain a honeycomb structure having a strong structure capable of sufficiently suppressing the movement (shift) of the honeycomb segments due to vibration or exhaust pressure. Furthermore, in the means proposed by Patent Document 2, a thickness (a bonding width) of a bonding material needs to be changed between an inlet side end surface and an outlet side end surface, which has caused the problem that assembling is difficult.

The present invention has been developed in view of such a situation, and an object thereof is to provide a honeycomb structure of a segment structure which is easily assembled (manufactured) and is capable of effectively suppressing the movement (shift) of honeycomb segments due to vibration or exhaust pressure during use.

To achieve the above object, according to the present invention, there is provided a honeycomb structure in the following.

According to a first aspect of the present invention, a honeycomb structure in which a plurality of honeycomb segments are integrally bonded via a bonding material is provided, each of the honeycomb segments having a first end surface, a second end surface, porous partition walls to define and form a plurality of cells extending from the first end surface to the second end surface, and an outer peripheral surface connecting the first end surface to the second end surface, wherein as to each of the honeycomb segments other than the honeycomb segments positioned in the outermost periphery of the honeycomb structure among the plurality of honeycomb segments, the first end surface and the second end surface have rectangular shapes having the same dimension, and are in a positional relation in which extending directions of long sides of the respective end surfaces are perpendicular to each other when the first end surface is seen from a vertical direction thereto, (X−Y)/2 is from 0.2 to 7 mm, where X is a length of each long side of each of the first end surface and the second end surface having the same dimension, and Y is a length of each short side of the first end surface and the second end surface having the same dimension, the outer peripheral surface includes four side surfaces, the four side surfaces are constituted of a pair of first tapered side surfaces including two side surfaces facing each other so that a space between the side surfaces becomes narrow from the side of the first end surface toward the side of the second end surface, and a pair of second tapered side surfaces including two side surfaces facing each other so that a space between the side surfaces becomes narrow from the second end surface side toward the first end surface side, and in two directions perpendicular to each other on each end surface of the honeycomb structure, the respective first end surfaces of the adjacent honeycomb segments are directed opposite to each other, and the extending direction of the long side of the first end surface of one honeycomb segment in the adjacent honeycomb segments is parallel to an extending direction of the short side of the second end surface of the other honeycomb segment.

According to a second aspect of the present invention, the honeycomb structure according to the above first aspect is provided, wherein the honeycomb segment has a shape which is symmetric twice to an axis passing an intersection of two diagonal lines of the first end surface having the rectangular shape and an intersection of two diagonal lines of the second end surface similarly having the rectangular shape.

According to a third aspect of the present invention, a honeycomb structure in which a plurality of honeycomb segments are integrally bonded via a bonding material is provided, each of the honeycomb segments having a first end surface, a second end surface, porous partition walls to define and form a plurality of cells extending from the first end surface to the second end surface, and an outer peripheral surface connecting the first end surface to the second end surface, wherein as to each of the honeycomb segments other than the honeycomb segments positioned in the outermost periphery of the honeycomb structure among the plurality of honeycomb segments, the first end surface and the second end surface have rectangular shapes having the same dimension, and are in a positional relation in which extending directions of long sides of the respective end surfaces are perpendicular to each other when the first end surface is seen from a vertical direction thereto, (X−Y)/2 is from 0.2 to 7 mm, where X is a length of each long side of each of the first end surface and the second end surface having the same dimension, and Y is a length of each short side of each of the first end surface and the second end surface having the same dimension, the outer peripheral surface includes four side surfaces, the four side surfaces are constituted of a pair of first tapered side surfaces including two side surfaces facing each other so that a space between the side surfaces becomes narrow from the side of the first end surface toward the side of the second end surface, and a pair of second tapered side surfaces including two side surfaces facing each other so that a space between the side surfaces becomes narrow from the second end surface side toward the first end surface side, the honeycomb segment has a shape which is symmetric twice to an axis passing an intersection of two diagonal lines of the first end surface having the rectangular shape and an intersection of two diagonal lines of the second end surface similarly having the rectangular shape, and in two directions perpendicular to each other on each end surface of the honeycomb structure, the respective first end surfaces of the adjacent honeycomb segments have the same direction, and the extending direction of the long side of the first end surface of one honeycomb segment in the adjacent honeycomb segments is parallel to an extending direction of the short side of the first end surface of the other honeycomb segment.

According to a fourth aspect of the present invention, the honeycomb structure according to any one of the above first to third aspects is provided, wherein the honeycomb segment has plugging portions to plug open end portions on the first end surface side of predetermined cells and open end portions on the second end surface side of the remaining cells.

According to a fifth aspect of the present invention, the honeycomb structure according to any one of the above first to fourth aspects is provided, wherein both of a shape of the cells in the first end surface and a shape of the cells in the second end surface are rectangular shapes.

According to a sixth aspect of the present invention, the honeycomb structure according to any one of the above first to fourth aspects is provided, wherein a shape of the cells in one of the first end surface and the second end surface is a square shape, and a shape of the cells in the other end surface is a rectangular shape.

According to a seventh aspect of the present invention, the honeycomb structure according to any one of the above first to fourth aspects is provided, wherein in the first end surface and the second end surface, two types of cells having different areas are alternately arranged.

According to an eighth aspect of the present invention, the honeycomb structure according to any one of the above first to seventh aspects is provided, wherein the honeycomb segments are integrally bonded via the bonding material, and then subjected to outer periphery grind processing, so that an outer periphery coating layer is formed on the processed surface of the bonded honeycomb segment.

The honeycomb structure of the present invention is constituted so that a shape and arrangement of honeycomb segments satisfy specific conditions, whereby the honeycomb structure has a strong structure in which a fixing force of the honeycomb segments is high. Therefore, even when this honeycomb structure is used in a filter to be disposed in an exhaust system, movement (shift) of the honeycomb segments due to vibration or exhaust pressure during the use of the filter does not easily occur. Furthermore, in part of cells, an axial direction is not parallel, but inclines to an axial direction of the honeycomb structure. Therefore, an exhaust gas flowing along the axial direction of the honeycomb structure easily comes in contact with partition walls to define and form the cells, with the result that a PM collecting efficiency enhances. Furthermore, in the honeycomb segments positioned in the outermost periphery of the honeycomb structure, among the part of the cells in which the axial direction inclines to the axial direction of the honeycomb structure, the cells having a large degree of the inclination are formed as dead channels into which the exhaust gas hardly flows, by outer periphery grind processing. Therefore, a warmth retaining effect is produced, and a heating efficiency during regeneration of the filter enhances. Furthermore, in the honeycomb structure of the present invention, in the vicinity of corner portions of the honeycomb segments, a portion of a bonding material is thick, and due to this thick portion, a heat capacity increases. Therefore, heat shock resisting properties are high, and damage caused by heat stress generated during the regeneration of the filter does not easily occur. Moreover, in the honeycomb structure of the present invention, the manufacturing thereof does not require any step that makes it difficult to assemble the honeycomb structure, for example, a step of changing a thickness of the bonding material between one end surface and the other end surface of the honeycomb structure, and hence the honeycomb structure can comparatively easily be manufactured.

DESCRIPTION OF THE PREFERRED EMBODIMENTS

Hereinafter, embodiments of the present invention will specifically be described. However, the present invention is not limited to the embodiments when interpreted, and various changes, modifications and improvements can be added on the basis of ordinary knowledge of a person skilled in the art without departing from the scope of the present invention.

Figure 1:
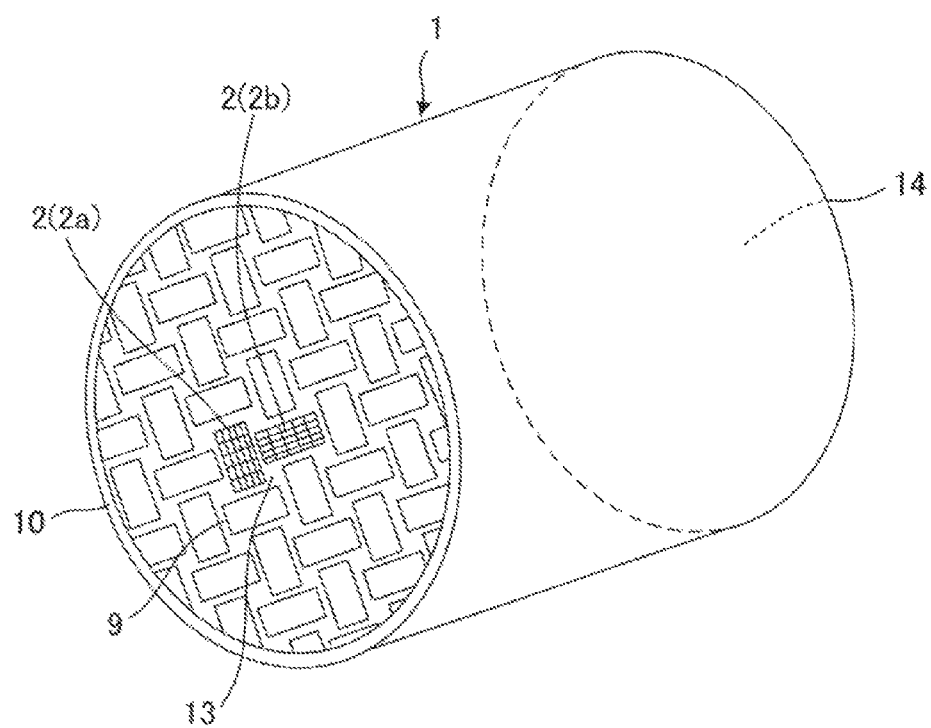
FIG. 1 is a schematic perspective view showing one example of an embodiment of a honeycomb structure according to the present invention.
Figure 2:
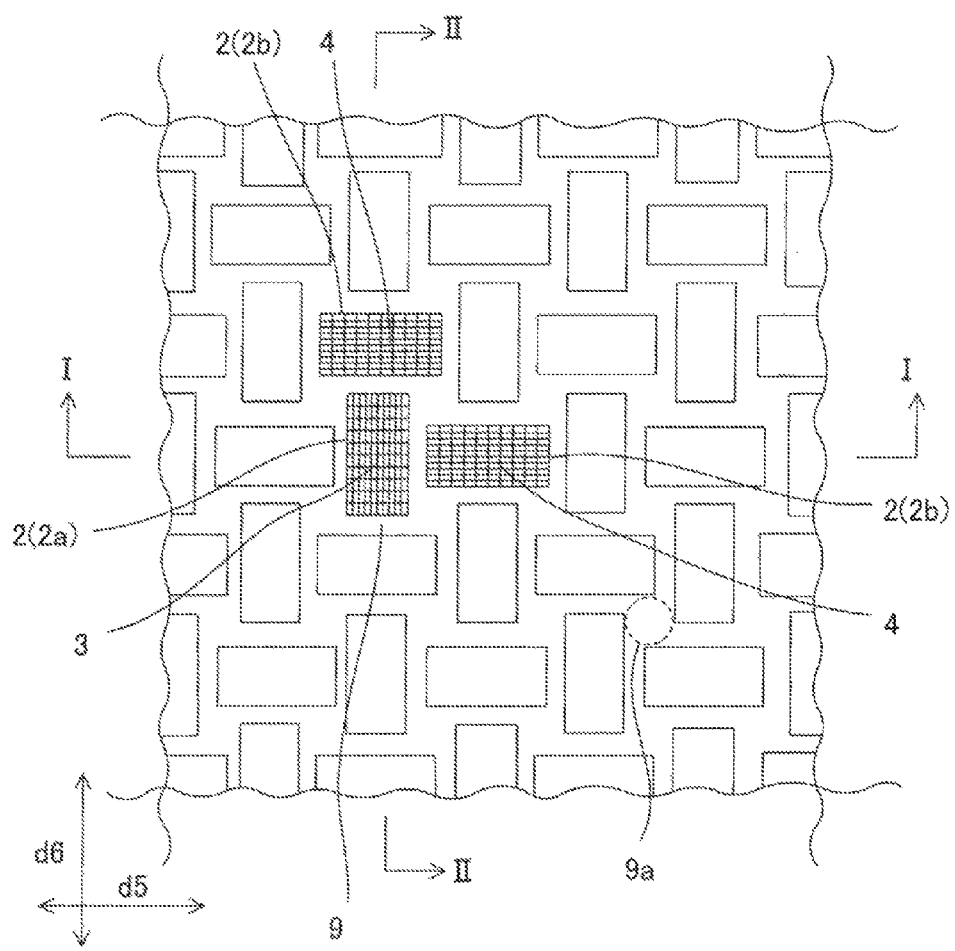
FIG. 2 is a schematic plan view showing a part of an end surface in the one example of the embodiment of the honeycomb structure according to the present invention.
Figure 3:
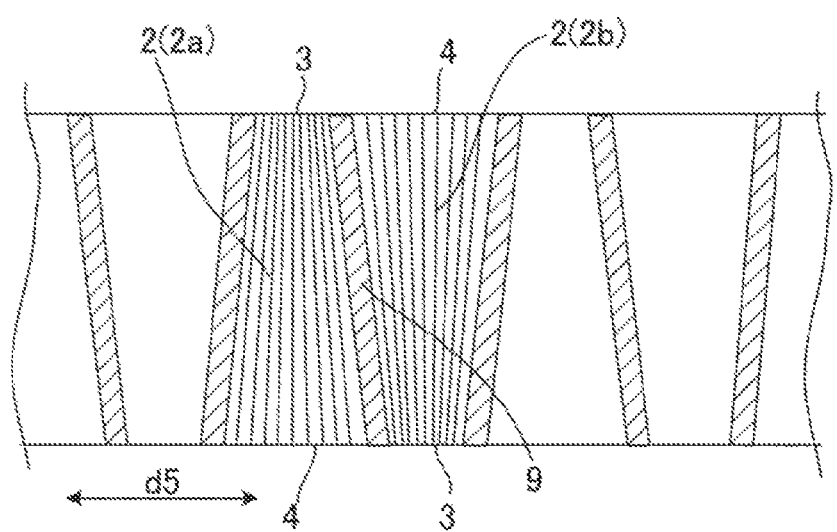
FIG. 3 is a sectional view cut along the I-I line of FIG. 2.
Figure 4:
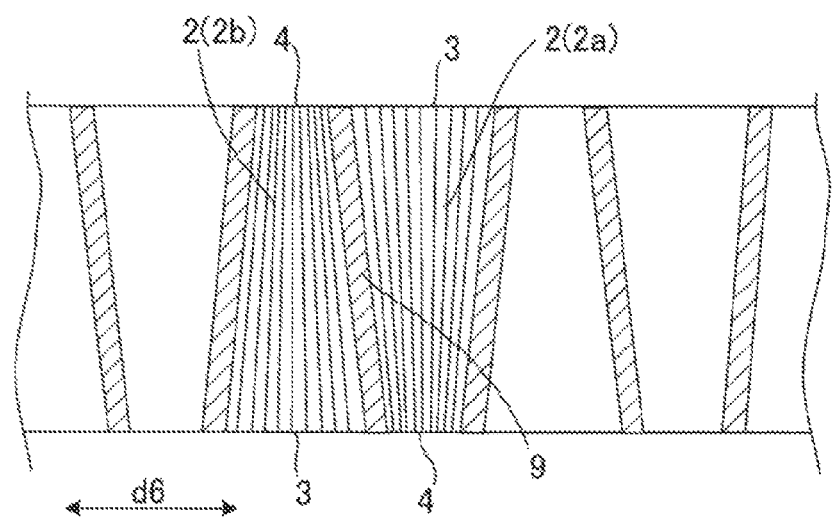
FIG. 4 is a sectional view cut along the II-II line of FIG. 2.
Figure 5:
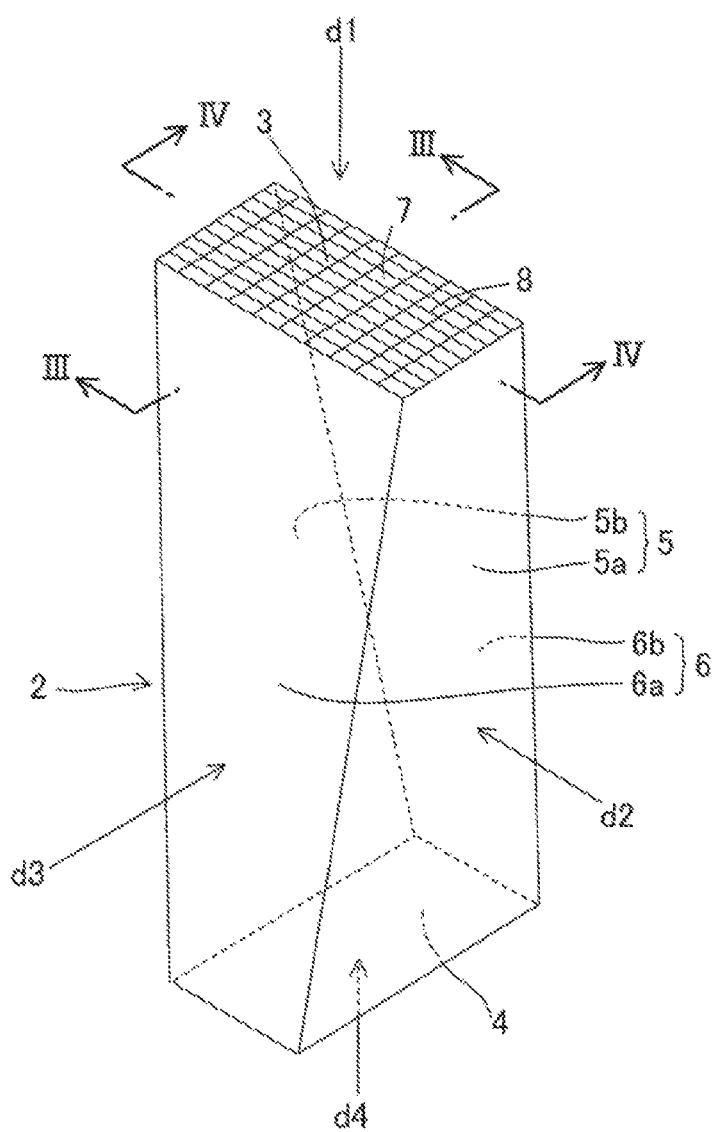
FIG. 5 is a schematic perspective view of a honeycomb segment used in the one example of the embodiment of the honeycomb structure according to the present invention.
Figure 6:
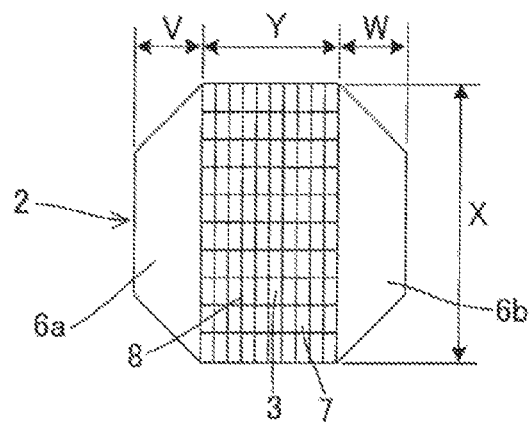
FIG. 6 is a schematic plan view of the honeycomb segment seen from a direction d1 of FIG. 5.
Figure 7:
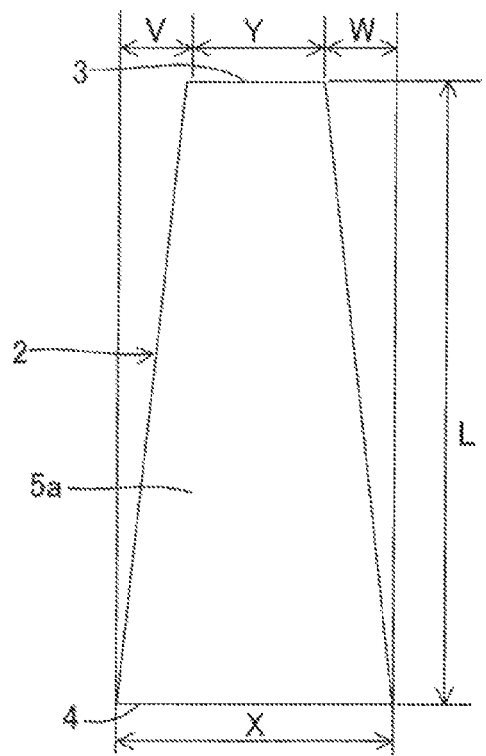
FIG. 7 is a schematic plan view of the honeycomb segment seen from a direction d2 of FIG. 5.
Figure 8:
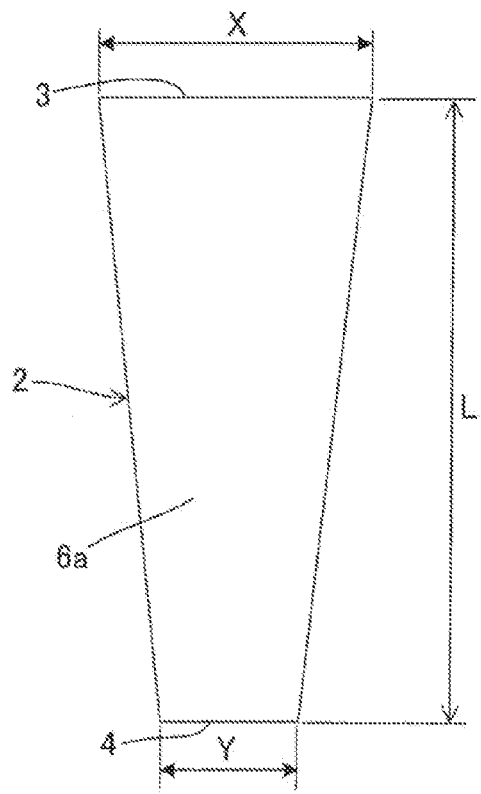
FIG. 8 is a schematic plan view of the honeycomb segment seen from a direction d3 of FIG. 5.
Figure 9:
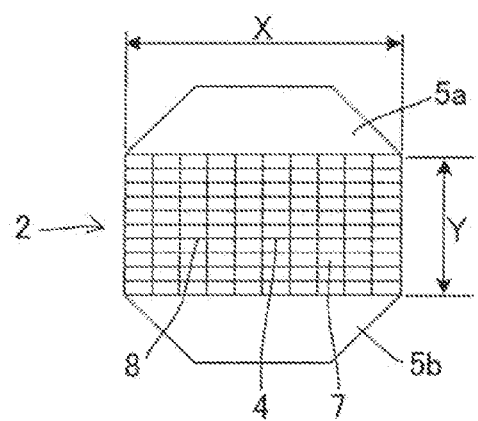
FIG. 9 is a schematic plan view of the honeycomb segment seen from a direction d4 of FIG. 5.
Figure 10:
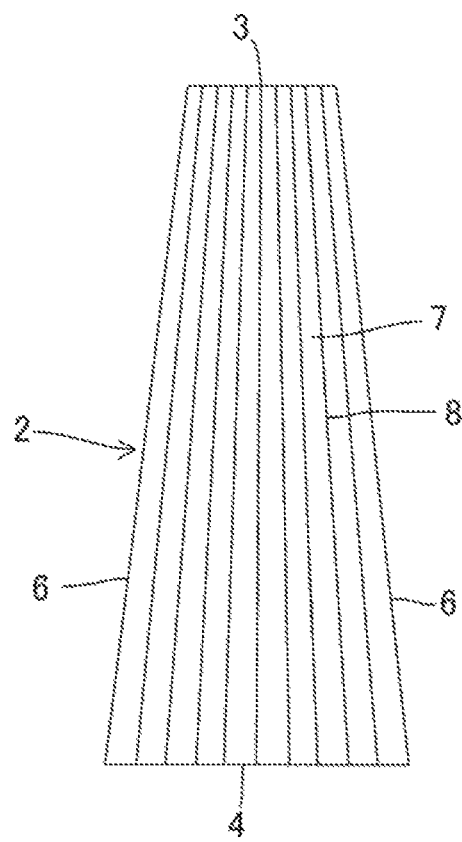
FIG. 10 is a sectional view cut along the line of FIG. 5.
Figure 11:
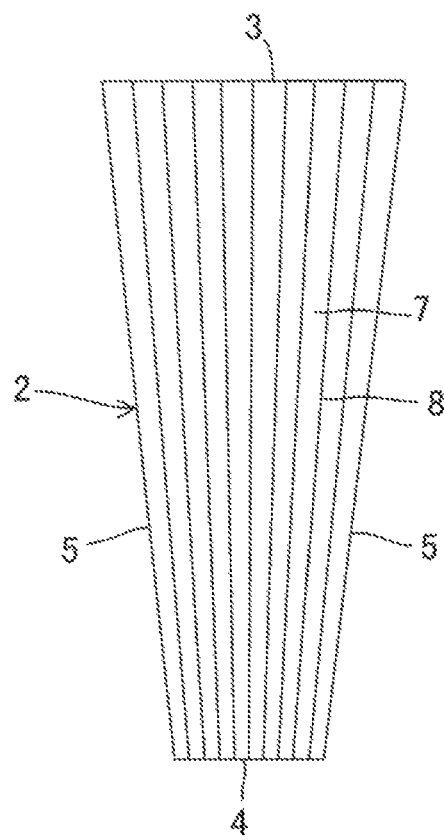
FIG. 11 is a sectional view cut along the IV-IV line of FIG. 5.
Figure 12:
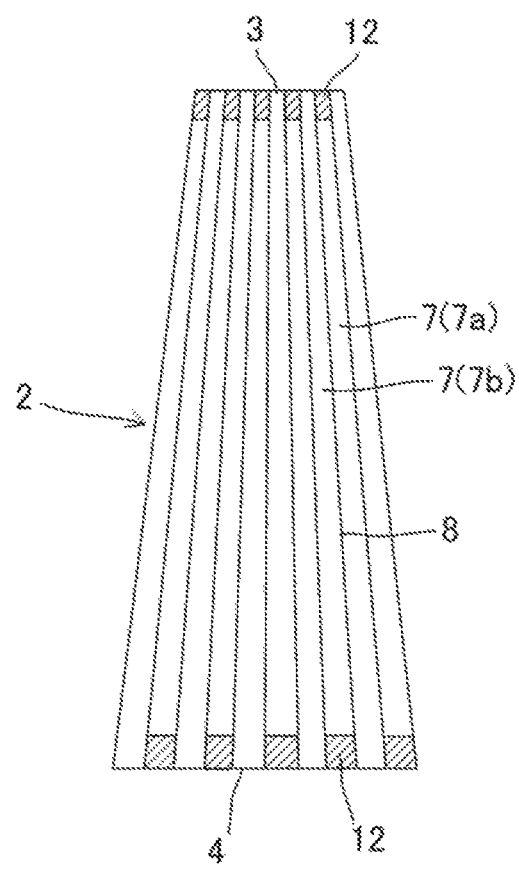
FIG. 12 is a schematic sectional view showing a state where plugging portions are formed in the honeycomb segment.
Figure 13:
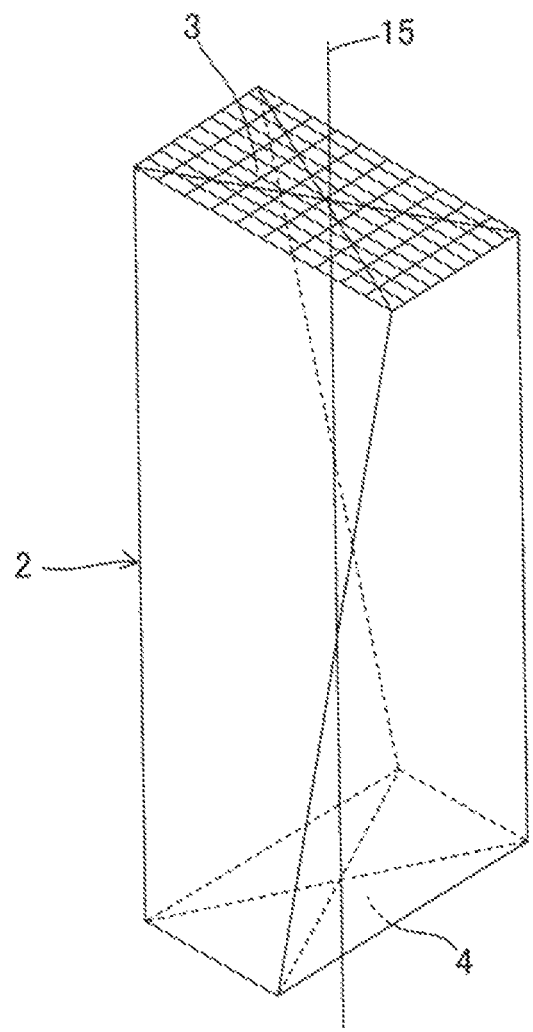
FIG. 13 is a schematic perspective view showing one example of a shape of the honeycomb segment.
Figure 14:
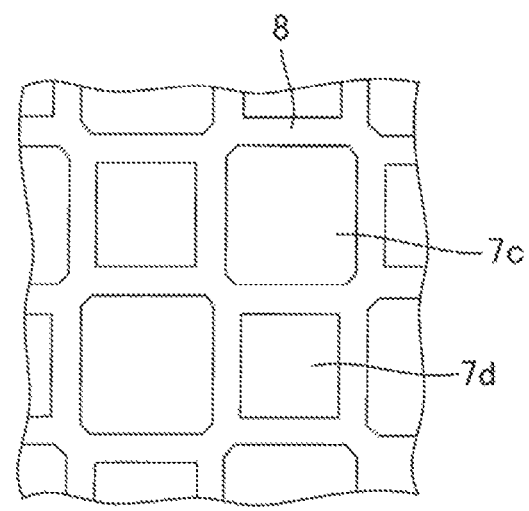
FIG. 14 is a schematic plan view partially showing one example of a cell shape.

(1) Honeycomb Structure:

FIG. 1 is a schematic perspective view showing one example of an embodiment of a honeycomb structure according to the present invention. FIG. 2 is a schematic plan view showing a part of an end surface in the one example of the embodiment of the honeycomb structure according to the present invention. FIG. 3 is a sectional view cut along the I-I line of FIG. 2, and FIG. 4 is a sectional view cut along the II-II line of FIG. 2. FIG. 5 is a schematic perspective view of a honeycomb segment used in the one example of the embodiment of the honeycomb structure according to the present invention. FIG. 6 is a schematic plan view of the honeycomb segment seen from a direction d1 of FIG. 5, FIG. 7 is a schematic plan view of the honeycomb segment seen from a direction d2 of FIG. 5, FIG. 8 is a schematic plan view of the honeycomb segment seen from a direction d3 of FIG. 5, and FIG. 9 is a schematic plan view of the honeycomb segment seen from a direction d4 of FIG. 5. FIG. 10 is a sectional view cut along the line of FIG. 5, and FIG. 11 is a sectional view cut along the IV-IV line of FIG. 5. FIG. 12 is a schematic sectional view showing a state where plugging portions are formed in the honeycomb segment. FIG. 13 is a schematic perspective view showing one example of a shape of the honeycomb segment, and FIG. 14 is a schematic plan view partially showing one example of a cell shape. It is to be noted that in FIGS. 1 to 4, the partition wall portions of the honeycomb segments except some of the segments are not depicted. Furthermore, in the present description, "an axial direction of cells" means "a length direction of the cells" or "an extending direction of partition walls". Furthermore, "an axial direction of the honeycomb segment" means "a length direction of the honeycomb segment" or "a direction vertical to a first end surface and a second end surface of the honeycomb segment". Furthermore, "an axial direction of the honeycomb structure" means "a length direction of the honeycomb structure" or "a direction vertical to both end surfaces (an inlet end surface and an outlet end surface) of the honeycomb structure".

In a honeycomb structure 1 according to the present invention, a plurality of honeycomb segments 2 are integrally bonded via a bonding material 9. In the honeycomb structure 1, one end surface is an inlet end surface 13 on an inlet side of a fluid such as an exhaust gas, and the other end surface is an outlet end surface 14 on an outlet side of the fluid. Each of the honeycomb segments 2 has a first end surface 3, a second end surface 4, porous partition walls 8 to define and form a plurality of cells 7 extending from the first end surface 3 to the second end surface 4, and an outer peripheral surface connecting the first end surface 3 to the second end surface 4.

In the present invention, among the plurality of honeycomb segments 2 constituting the honeycomb structure 1, the honeycomb segments other than the honeycomb segments positioned in the outermost periphery of the honeycomb structure have a shape satisfying specific conditions. Specifically, first, the first end surface 3 and the second end surface 4 of the honeycomb segment 2 are rectangular shapes having the same dimension. However, the first end surface 3 and the second end surface 4 are in a positional relation in which extending directions of long sides of the respective end surfaces are perpendicular to each other when the first end surface 3 is seen from a vertical direction thereto. Here, note that honeycomb segments positioned in the outermost periphery of the honeycomb structure have substantially the same structure as those constituting the remaining portions of the honeycomb structure, as mentioned above. However, they are different from such honeycomb segments constituting the remaining portions in the point that the outermost peripheries of the respective honeycomb segments positioned in the outermost periphery of the honeycomb structure have outer periphery coating layers formed by coating processed surfaces with the outer periphery processing with outer periphery coating material.

The outer peripheral surface of the honeycomb segment 2 includes four side surfaces. These four side surfaces are constituted of a pair of first tapered side surfaces 5 and a pair of second tapered side surfaces 6. The pair of first tapered side surfaces 5 include two side surfaces 5a, 5b facing each other so that a space between the side surfaces becomes narrow from the side of the first end surface 3 toward the side of the second end surface 4. Furthermore, the pair of second tapered side surfaces 6 include two side surfaces 6a, 6b facing each other so that a distance between the tapered side surfaces becomes narrow from the second end surface 4 side toward the first end surface 3 side.

Furthermore, as shown in FIGS. 6 to 9, (X−Y)/2 is from 0.2 to 7 mm, where X is a length of each long side of each of the first end surface 3 and the second end surface 4 having the same dimension, and Y is a length of each short side of each of the first end surface 3 and the second end surface 4 having the same dimension.

It is to be noted that symbols concerning honeycomb segment dimensions other than X and Y in FIGS. 6 to 9 will be described. L is a distance between the first end surface 3 and the second end surface 4, i.e., a length of the honeycomb segment 2. V is a distance between one long side of the first end surface 3 and one short side of the second end surface 4, when the first end surface 3 is seen from the vertical direction thereto. W is a distance between the other long side of the first end surface 3 and the other short side of the second end surface 4, similarly when the first end surface 3 is seen from the vertical direction thereto. V and W may be the same value or different values. When V and W are the same value, the value is (X−Y)/2.

Furthermore, when V and W have the same value, a shape of the honeycomb segment is, as shown in FIG. 13, a shape which is symmetric twice to an axis 15 passing an intersection of two diagonal lines of the first end surface 3 having the rectangular shape and an intersection of two diagonal lines of the second end surface 4 similarly having the rectangular shape. When the honeycomb segment has such a shape, a thickness of a portion of the bonding material which is sandwiched between the honeycomb segments can be uniform, and hence the honeycomb structure is easily manufactured.

In the present invention, in addition to the above-mentioned specification of the shape of the honeycomb segment 2, arrangement of the honeycomb segments 2 also needs to satisfy specific conditions. Specifically, as shown in FIGS. 2 to 4, the honeycomb segments are arranged so that in two directions d5 and d6 perpendicular to each other on an end surface of the honeycomb structure, the respective first end surfaces 3 of adjacent honeycomb segments 2a and 2b are directed opposite to each other. It is to be noted that when the honeycomb segments are arranged so that the respective first end surfaces 3 of the honeycomb segments 2a and 2b are directed opposite to each other, the respective second end surfaces 4 of the honeycomb segments 2a and 2b are necessarily directed opposite to each other.

Furthermore, the honeycomb segments are arranged so that in the relation between the adjacent honeycomb segments 2a and 2b, the extending direction of the long side of the first end surface 3 of one honeycomb segment 2a is parallel to an extending direction of the short side of the second end surface 4 of the other honeycomb segment 2b.

It is to be noted that although not shown in the drawing, the honeycomb segments having the shape which is symmetric twice as described above do not have to be arranged so that in two directions perpendicular to each other on the end surface of the honeycomb structure, the respective first end surfaces of the adjacent honeycomb segments are directed opposite to each other. That is, in the case of the shape which is symmetric twice as described above, the honeycomb segments may be arranged so that in the two directions perpendicular to each other on the end surface of the honeycomb structure, the respective first end surfaces of the adjacent honeycomb segments have the same direction. However, in this case, it is necessary to arrange the honeycomb segments so that in the relation between the adjacent honeycomb segments, the extending direction of the long side of the first end surface of one honeycomb segment is parallel to the extending direction of the short side of the first end surface of the other honeycomb segment.

The honeycomb structure of the present invention is constituted so that the shape and arrangement of the honeycomb segments satisfy the specific conditions as described above, whereby the honeycomb structure has a strong structure where a fixing force of the honeycomb segments is high. In consequence, even when this honeycomb structure is used in a filter to be disposed in an exhaust system of a diesel engine, a gasoline engine or the like, movement (shift) of the honeycomb segments due to vibration or exhaust pressure during the use of the filter does not easily occur.

In such a conventional usual honeycomb segment (a honeycomb segment whose outer shape is a quadrangular pillar-like shape) as described in Patent Document 1, a pair of facing side surfaces are parallel to each other and another pair of facing side surfaces are also parallel to each other. On the other hand, in the honeycomb segment for use in the present invention, a space between the pair of facing side surfaces becomes narrow from the first end surface side toward the second end surface side, and a space between another pair of facing side surfaces becomes narrow from the second end surface side toward the first end surface side. Such a difference in outer shape of the honeycomb segments is added to the above-mentioned specification of the arrangement of the honeycomb segments, whereby in the honeycomb structure of the present invention, the movement (shift) of the honeycomb segments due to the vibration or the exhaust pressure does not easily occur as compared with the conventional honeycomb structure. This is supposedly because in the honeycomb structure of the present invention, the honeycomb segments mutually bite into the honeycomb structure in the form of a wedge and accordingly do not easily move from each other, and because a bonding area between the segments increases.

Furthermore, in the honeycomb structure of the present invention, the manufacturing thereof does not require any step that makes it difficult to assemble the honeycomb structure, for example, a step in which a thickness of the bonding material between the side surfaces of the adjacent honeycomb segments is changed between one end surface and the other end surface of the honeycomb structure as in a honeycomb structure described in Patent Document 2. Therefore, the honeycomb structure of the present invention can comparatively simply be manufactured.

Furthermore, in the honeycomb structure of the present invention, as shown in FIG. 2, in the vicinity of corner portions of the honeycomb segments 2, a portion 9a of the bonding material 9 is thick. Then, due to this thick portion, a heat capacity increases. Therefore, heat shock resisting properties are high, and damage caused by heat stress generated during regeneration of the filter does not easily occur.

In the honeycomb segment 2 for use in the present invention, the plurality of cells 7 defined and formed by the porous partition walls 8 extend from the first end surface 3 to the second end surface 4. Therefore, the number of the cells 7 opened in the first end surface 3 is the same as that of the cells 7 opened in the second end surface 4. Furthermore, the first end surface 3 and the second end surface 4 are the rectangular shapes having the same dimension, and hence the areas of the end surfaces are equal to each other and the end surfaces have the same cell density (the number of the cells per unit area). However, as described above, the first end surface 3 and the second end surface 4 are in the positional relation in which the extending direction of the respective long sides are perpendicular to each other, when the first end surface 3 is seen from the vertical direction thereto. Therefore, usually, the axial directions of all the cells are not the same direction (not parallel). That is, as shown in FIG. 10, the axial directions of the cells 7 present at positions away from the pair of second tapered side surfaces 6 are substantially parallel to the axial direction (the length direction) of the honeycomb segment 2, but the axial directions of the cells 7 present at positions close to the pair of second tapered side surfaces 6 incline to the axial direction of the honeycomb segment 2. Furthermore, the inclination is larger in the cells 7 closer to the pair of tapered side surfaces 6. Furthermore, as shown in FIG. 11, the axial directions of the cells 7 present at positions away from the pair of first tapered side surfaces 5 are substantially parallel to the axial direction (the length direction) of the honeycomb segment 2, but the axial directions of the cells 7 present at positions close to the pair of first tapered side surfaces inclines to the axial direction of the honeycomb segment 2. Furthermore, the inclination is larger in the cells 7 closer to the pair of tapered side surfaces 5.

When the axial direction of the honeycomb segment is aligned with the axial direction of the honeycomb structure, the exhaust gas flowing along the axial direction of the honeycomb structure easily comes in contact with the partition walls of the cells whose axial directions incline to the axial direction of the honeycomb segment. Therefore, when the honeycomb structure of the present invention is used in the filter, a PM collecting efficiency enhances. Furthermore, in the honeycomb segments positioned in the outermost periphery of the honeycomb structure, among part of the cells whose axial directions incline to the axial directions of the honeycomb segments, the cells having a large degree of the inclination are formed as dead channels into which the exhaust gas hardly flows, by the grind processing of an outer periphery of the honeycomb structure. Furthermore, a warmth retaining effect is produced by the cells as the dead channels, and a heating efficiency during the regeneration of the filter enhances.

Further, in the present invention, a sectional area of a cross section vertical to the axial direction of the honeycomb segment changes along the axial direction of the honeycomb segment, and is different from each of the areas of the first end surface 3 and the second end surface 4. Specifically, the cross section vertical to the axial direction in the middle of the axial direction of the honeycomb segment is a square shape in which a length of one side is $(X+Y)/2$, where X is the length of each long side of the end surface (the first end surface 3 and the second end surface 4) and Y is a length of each short side. A sectional area of the square shape is larger than an area $(X \times Y)$ of the end surface as much as $(X-Y)^2/4$. Furthermore, a sectional area of each cell changes along the axial direction of the cell in accordance with the change of the sectional area of the honeycomb segment. That is, as described above, the cell density of the first end surface 3 is the same as that of the second end surface 4, but the sectional area of the cell is not constant in the axial direction of the cell. Thus, in the present invention, the sectional area of the cell is not constant, but changes along the axial direction of the cell, whereby the exhaust gas more easily comes in contact with the partition walls to define and form the cells, and the PM collecting efficiency enhances.

In the present invention, as described above, $(X-Y)/2$ is from 0.2 to 7 mm, where X is a length of each long side of each of the first end surface 3 and the second end surface 4 having the same dimension, and Y is a length of each short side of each of the first end surface 3 and the second end surface 4 having the same dimension. When $(X-Y)/2$ is smaller than 0.2 mm, the movement of the honeycomb segments due to the vibration or the exhaust pressure cannot sufficiently be suppressed sometimes. Furthermore, when $(X-Y)/2$ exceeds 7 mm, a direction in which the exhaust gas flows noticeably changes, so that a pressure loss of the honeycomb structure increases. Additionally, when the honeycomb structure is used as a PM collecting filter to be disposed in the exhaust system of the engine, the lowering of an output of the engine is incurred sometimes. Furthermore, when $(X-Y)/2$ is in excess of 7 mm, as described later, the cells are not easily evenly deformed and fluctuations are generated in a shape or a size of each cell sometimes, in a case where facing side surfaces of a formed honeycomb body obtained by extrusion-forming are sandwiched by using pressing plates and the formed honeycomb body is pressurized and deformed to obtain the honeycomb segments having a predetermined shape. It is to be noted that from the viewpoints of the suppression of the movement of the honeycomb segments due to the vibration or the exhaust pressure, the suppression of the increase of the pressure loss, the even deformation of the cells during the preparation of the honeycomb segments and the PM collecting efficiency, $(X-Y)/2$ is preferably from 0.5 to 6.5 mm and especially preferably from 1 to 5 mm.

In the present invention, each corner portion of a cross section perpendicular to the length direction of the honeycomb segment 2 is preferably formed into a circular shape having a radius of 0.1 to 5 mm. When the corner portion is formed into the circular shape in this manner, concentration of stress onto the corner portion can be suppressed, and the honeycomb segment 2 is not easily damaged.

In the present invention, a material of the honeycomb segments 2 preferably contains, as a main component, at least one selected from the group consisting of cordierite, silicon carbide, mullite, aluminum titanate, zeolite, vanadium and alumina. Here, "the main composition" means a component in excess of 50 mass % of the whole material.

An average pore diameter of the partition walls 8 of the honeycomb segments 2 is preferably from 5 to 100 µm and especially preferably from 8 to 50 µm. When the average pore diameter of the partition walls 8 is smaller than 5 µm, the pressure loss of the resulting honeycomb structure increases. When the resulting honeycomb structure is used as the PM collecting filter to be disposed in the exhaust system of the engine, the lowering of the output of the engine is incurred sometimes. Moreover, when the average pore diameter of the partition walls 8 exceeds 100 µm, a sufficient strength cannot be obtained sometimes. It is to be noted that "the average pore diameter" mentioned herein is a value measured by a mercury porosimeter.

A porosity of the partition walls 8 of the honeycomb segments 2 is preferably from 30 to 80% and especially preferably from 35 to 75%. When the porosity of the partition walls 8 is smaller than 30%, the pressure loss of the honeycomb structure increases. Furthermore, when the resulting honeycomb structure is used as the PM collecting filter to be disposed in the exhaust system of the engine, the lowering of the output of the engine is incurred sometimes. Moreover, when the porosity of the partition walls 8 exceeds 80%, the sufficient strength cannot be obtained sometimes. It is to be noted that "the porosity" mentioned herein is a value measured by the mercury porosimeter.

A thickness of the partition walls 8 of the honeycomb segments 2 is preferably from 40 to 600 µm and especially preferably from 100 to 400 µm. When the thickness of the partition walls 8 is smaller than 40 µm, the sufficient strength cannot be obtained sometimes. Furthermore, when the thickness of the partition walls 8 exceeds 600 µm, the pressure loss of the resulting honeycomb structure increases. Furthermore, when the resulting honeycomb structure is used as the PM collecting filter to be disposed in the exhaust system of the engine, the lowering of the output of the engine is sometimes brought into.

A cell density of the honeycomb segments 2 is preferably from 15 to 200 cells/cm$^2$ and especially preferably from 30 to 100 cells/cm$^2$. When the cell density is smaller than 15 cells/cm$^2$, the pressure loss increases in a short time and a strength cannot sufficiently be obtained sometimes in the case where the honeycomb structure is used as the PM collecting filter to be disposed in the exhaust system of the engine. Moreover, when the cell density is in excess of 200 cells/cm$^2$, the pressure loss of the honeycomb structure increases. Additionally, when the honeycomb structure is used as the PM collecting filter to be disposed in the exhaust system of the engine, the lowering of the output of the engine is incurred sometimes.

In the present invention, as to a thickness of the bonding material 9, i.e., bonding layer which integrally bonds the plurality of honeycomb segments 2, the thickness of the portion of the bonding material which is sandwiched between the honeycomb segments is preferably from 0.05 to 3.0 mm. There is not any special restriction on a material of the bonding material 9, and an example of the material is preferably a material in which ceramic particles of silicon carbide, alumina, silicon nitride or the like or inorganic fibers are bound by colloidal silica or colloidal alumina. The bonding material of such a material can effectively relax heat stress, when the heat stress is generated in the honeycomb structure.

There is not any special restriction on a shape (an outer shape) of the honeycomb structure 1 of the present invention, and examples of the shape include a columnar shape, an elliptic pillar shape, and a polygonal pillar shape. It is to be noted that to obtain a desirable shape of the honeycomb structure of the present invention, the plurality of honeycomb segments are bonded by the bonding material, and then the outer periphery grind processing is preferably performed. By this outer periphery grind processing, as consequence, the honeycomb segments positioned in the outermost periphery of the processed honeycomb structure have a shape different from that of the other honeycomb segments (hereinafter referred to as "complete segments" sometimes). That is, part of the honeycomb segments positioned in the outermost periphery of the assembled honeycomb structure are removed by the outer periphery grind processing, and hence the shape of those segments has lacked portion due to the removed part by processing, compared with the complete honeycomb segment. In the processed surface subjected to the outer periphery grind processing (the processed outer peripheral surface of the honeycomb structure), the cells are exposed. Therefore, as shown in FIG. 1, an outer periphery coating layer 10 is preferably formed on the processed surface. In a forming material of the outer periphery coating layer 10, the same material as the forming material of the bonding material is preferably used.

In the present invention, there is not any special restriction on the cell shape of the honeycomb segments, but as shown in FIG. 6 and FIG. 9, both of the shape of the cells 7 in the first end surface 3 and the shape of the cells 7 in the second end surface 4 are preferably rectangular shapes. Moreover, it is also preferable that the shape of the cells 7 in one of the first end surface 3 and the second end surface 4 is a square shape and the shape of the cells 7 in the other end surface is the rectangular shape. Furthermore, two types of cells having different areas may alternately be arranged in the first end surface 3 and the second end surface 4. Moreover, in this case, the two type of cells having different areas may have different shapes. For example, as shown in FIG. 14, a cell 7c having a larger area may have an octagonal shape and a cell 7d having a smaller area may have a square shape.

When the honeycomb structure of the present invention is used in the PM collecting filter, as shown in FIG. 12, plugging portions 12 are preferably formed to plug open end portions on the first end surface 3 side of predetermined cells 7a and open end portions on the second end surface 4 side of remaining cells 7b in each of the honeycomb segments 2. One open end portion of each of the cells 7 of the honeycomb segment 2 is plugged with the plugging portion 12 in this way, whereby the honeycomb structure becomes a wall flow type filter having a high PM collecting efficiency. In this wall flow type filter, the exhaust gas which has flowed into the cells from the inlet end surface of the honeycomb structure passes the partition walls, and then flows out of the cells from the outlet end surface. Furthermore, when the exhaust gas passes the partition walls, the partition walls function as filter layers, and the PM included in the exhaust gas is collected. It is to be noted that the plugging portions 12 are preferably formed so that the first end surface 3 and the second end surface 4 have checkered patterns, respectively, by the cells 7 having the open end portions plugged with the plugging portions 12 and the cells 7 which do not have the open end portions plugged with the plugging portions 12.

A material of the plugging portions 12 is preferably a material which is considered to be preferable as the material of the honeycomb segments 2. The material of the plugging portions 12 and the material of the honeycomb segments 2 may be the same material or different materials.

(2) Manufacturing Method of Honeycomb Structure:

One example of a manufacturing method of the honeycomb structure according to the present invention will be described. First, to prepare the honeycomb segments, a forming raw material containing a ceramic raw material is prepared. The ceramic raw material to be contained in the forming raw material is preferably at least one selected from the group consisting of a cordierite forming raw material, cordierite, silicon carbide, a silicon-silicon carbide composite material, mullite, aluminum titanate, zeolite, and vanadium. It is to be noted that the cordierite forming raw material is the ceramic raw material blended so as to have a chemical composition in which silica falls in a range of 42 to 56 mass %, alumina falls in a range of 30 to 45 mass % and magnesia falls in a range of 12 to 16 mass %. The cordierite forming raw material is fired to become cordierite.

The forming raw material is preferably prepared by mixing the above-mentioned ceramic raw material with a dispersion medium, an organic binder, an inorganic binder, a pore former, a surfactant and the like. There is not any special restriction on the composition ratio of each raw material, and the composition ratio is preferably determined in accordance with a structure, a material and the like of the honeycomb structure to be prepared.

Next, the forming raw material is kneaded to obtain a kneaded material. There is not any special restriction on a method of kneading the forming raw material to form the kneaded material. An example of the method is preferably a method using a kneader, a vacuum clay kneader or the like.

Next, the kneaded material is extruded to prepare a formed honeycomb body. Here, the formed honeycomb body obtained by the extrusion has a quadrangular pillar-like outer shape in which both end surfaces have congruent square shapes. Next, prior to drying this formed honeycomb body, a pair of facing side surfaces of the formed honeycomb body are sandwiched by using two pressing plates having flat surfaces, and the formed honeycomb body is pressurized and deformed so that a space between the pair of side surfaces becomes narrow from one end surface side of the formed honeycomb body toward the other end surface side thereof. Furthermore, another pair of facing side surfaces of the formed honeycomb body are similarly sandwiched by using two pressing plates having flat surfaces, and the formed honeycomb body is pressurized and deformed so that a distance between the other pair of side surfaces gradually becomes narrow from the other end surface side of the formed honeycomb body toward the one end surface side thereof. By this pressurizing deformation, the formed honeycomb body can be obtained in which the one end surface (the end surface finally as the first end surface) and the other end surface (the end surface finally as the second end surface) are the rectangular shapes having the same dimension, and the end surfaces are in a positional relation where extending directions of long sides of the respective end surfaces are perpendicular to each other when the one end surface is seen from the vertical direction thereto. The formed honeycomb body prior to the drying is soft, and hence the body can easily be pressurized and deformed by using the above-mentioned pressing plates. It is to be noted that the pressurizing deformation of one pair of facing side surfaces and the pressurizing deformation of the other pair of facing side surfaces are not performed simultaneously, but one pressurizing deformation is preferably performed and then the other pressurizing deformation is preferably performed. Furthermore, in this case, when the one pressurizing deformation is performed, the pair of side surfaces are held to be sandwiched between the two flat plates so as to be pressurized or deformed, thereby preferably preventing the deformation of the pair. In consequence, a flat surface state of the pair of side surfaces which are not being pressurized or deformed can be held more suitably. The pressurizing deformation is preferably performed within one hour after the extrusion-forming, which depends on an atmosphere temperature or humidity.

After this pressurizing deformation, thus formed honeycomb body is dried. There is not any special restriction on a drying method, but examples of the drying method preferably include hot air drying, microwave drying, dielectric drying, reduced-pressure drying, vacuum drying, and freeze-drying. Among these methods, the dielectric drying, the microwave drying, the hot air drying or any combination of these methods is preferably performed.

Next, the dried formed honeycomb body (the dried honeycomb body) is fired to prepare the honeycomb segment. It is to be noted that prior to this firing (the final firing), calcinating (degreasing) is preferably performed to remove the binder and the like included in the dried formed honeycomb body. There is not any special restriction on calcinating conditions, as long as organic substances (the organic binder, the surfactant, the pore former, etc.) included in the honeycomb body can be removed. In general, a burning temperature of the organic binder is from about 100 to 300° C., and a burning temperature of the pore former is from about 200 to 800° C. Therefore, among the calcinating conditions, heating is preferably performed at about 200 to 1000° C. in an oxidation atmosphere for about three to 100 hours. Conditions (temperature, time, atmosphere, etc.) to fire (finally fire) the dried formed honeycomb body may vary in accordance with a type of the forming raw material, and hence suitable conditions may be selected in accordance with the type thereof. For example, when the cordierite forming raw material is used, the firing temperature is preferably from 1410 to 1440° C. Furthermore, the firing time is preferably from four to eight hours, as time to keep the highest temperature. There is not any special restriction on a system which performs the calcinating and the final firing. Examples of a suitable system include an electric furnace and a gas furnace.

When the honeycomb structure including the plugging portions is prepared, the plugging portions are formed in the honeycomb segments after the firing. The plugging portions are formed so as to plug the open end portions on one end surface (the first end surface) side of the predetermined cells, and alternately the open end portions of the remaining cells on the other end surface (the second end surface) side. In this formation of the plugging portions, a heretofore known method can be used. In an example of the specific method, first, a sheet is attached to the end surface of the honeycomb segment prepared by the above-mentioned method. Next, holes are made at positions of this sheet which correspond to the cells to be provided with the plugging portions. Next, the end surface of the honeycomb segment is immersed into a plugging slurry as a slurried forming material of the plugging portions in a state where this sheet is attached as it is, to charge the plugging slurry into the open end portions of the cells which are to be plugged through the holes made in the sheet. The plugging slurry charged in this manner is dried and then fired to harden, whereby the plugging portions are formed. As the forming material of the plugging portions, the same material as the forming material of the honeycomb segments is preferably used. It is to be noted that the formation of the plugging portions may be performed in any stage after the drying of the formed honeycomb body and after the calcinating or the firing (the final firing) thereof.

Next, a slurried bonding material is applied to the side surface of each obtained honeycomb segment, and the plurality of honeycomb segments are assembled so that the side surfaces of the honeycomb segments are bonded to one another by using the bonding material. During this assembling, the honeycomb segments are arranged so that in two directions perpendicular to each other, the first end surfaces of the adjacent honeycomb segments are directed opposite to each other. Furthermore, the honeycomb segments are arranged so that the extending direction of the long side of the first end surface of one honeycomb segment in the adjacent honeycomb segments is parallel to the extending direction of the short side of the second end surface of the other honeycomb segment. It is to be noted that when the honeycomb segments have the above-mentioned shape which is symmetric twice, the honeycomb segments may be arranged so that in two directions perpendicular to each other, the respective first end surfaces of the adjacent honeycomb segments have the same direction. However, in this case, the honeycomb segments are arranged so that the extending direction of the long side of the first end surface of one honeycomb segment in the adjacent honeycomb segments is parallel to the extending direction of the short side of the first end surface of the other honeycomb segment. The plurality of honeycomb segments are assembled in this manner and the bonding material applied is heated and dried, whereby it is possible to obtain the honeycomb structure in which the plurality of honeycomb segments are integrally bonded via the bonding material.

As the bonding material, it is possible to suitably use, for example, a slurried material obtained by adding additives such as an organic binder, resin balloons or a dispersant and water to an inorganic raw material such as inorganic fibers, colloidal silica, clay or ceramic particles, followed by the kneading. There is not any special restriction on a method of applying the bonding material to the side surfaces of the honeycomb segments, and a method such as brush application can be used.

The plurality of honeycomb segments are bonded by the bonding material, and then if necessary, an outer peripheral portion of the obtained honeycomb structure is subjected to the grind processing, so that the honeycomb structure has a desirable shape such as a columnar shape. In this case, the outer periphery coating layer is preferably formed on the processed surface after the grind processing.

The outer periphery coating layer is formed by applying an outer periphery coating material to the processed surface of the honeycomb structure after the grind processing. As the outer periphery coating material, it is possible to suitably use a slurried material obtained by adding additives such as inorganic fibers, colloidal silica, clay, an inorganic raw material binder of ceramic particles or the like, resin balloons and a dispersant, and also adding water, followed by kneading. There is not any special restriction on a method of applying the outer periphery coating material to the processed surface of the honeycomb structure, and an example of the method is preferably a method of coating the processed surface of the honeycomb structure subjected to the grind processing with the outer periphery coating material by a rubber spatula while rotating the honeycomb structure on a potter's wheel.

EXAMPLES

Hereinafter, examples of the present invention will be described in more detail, but the present invention is not limited to these examples.

Examples 1 to 28 and Comparative Examples 1 to 9

80 parts by mass of SiC powder and 20 parts by mass of metal Si powder were mixed to obtain a ceramic raw material. To the obtained ceramic raw material, a pore former, a binder, a surfactant and water were added, to prepare a forming raw material, which was kneaded to obtain a kneaded material. As the pore former, starch was used. Furthermore, as the binder, methylcellulose and hydroxypropoxyl methylcellulose were used. As the surfactant, sodium laurate was used. Amounts of the respective raw materials to be added to 100 parts by mass of the ceramic raw material were 5 parts by mass of the pore former, 3 parts by mass of methylcellulose, 3 parts by mass of hydroxypropoxyl methylcellulose, 1 part by mass of the surfactant, and 32 parts by mass of the water.

When the obtained kneaded material was extruded by using a formed honeycomb body forming die and was fired as it was without performing pressurizing deformation as described in the following, a formed honeycomb body having a quadrangular pillar-like outer shape in which both end surfaces had congruent square shapes was obtained so that a length of each of all sides was the same length as X shown in Table 1 and Table 2 in an end surface after the firing, a thickness of partition walls was 0.13 mm, a cell shape was a square shape and a cell density was 70 cells/cm². Then, prior to drying this formed honeycomb body, a pair of facing side surfaces of the obtained formed honeycomb body were sandwiched by using two pressing plates having flat surfaces, and the formed honeycomb body was pressurized and deformed so that a distance between the pair of side surfaces narrowed from one end surface side of the formed honeycomb body toward the other end surface side thereof and the distance between the side surfaces in the other end surface had a value of Y shown in Table 1 and Table 2 after the firing. Furthermore, another pair of facing side surfaces of the formed honeycomb body were sandwiched by using two pressing plates similarly having flat surfaces, and the formed honeycomb body was pressurized and deformed so that a distance between the other pair of side surfaces narrowed from the other end surface side of the formed honeycomb body toward the one end surface side thereof and the distance between the side surfaces in the one end surface had a value of Y shown in Table 1 and Table 2 after the firing. By this pressurizing deformation, the formed honeycomb body was obtained in which one end surface (the end surface finally as a first end surface) and the other end surface (the end surface finally as a second end surface) were rectangular shapes having the same dimension and were in a positional relation where extending directions of long sides of the respective end surfaces were perpendicular to each other when the one end surface was seen from a vertical direction thereto. Afterward, the formed honeycomb body was dried by microwaves and hot air to obtain a dried honeycomb body.

Next, the plugging portions were formed by plugging alternately open end portions of cells of this dried honeycomb body. The formation of the plugging portions was carried out so that the respective end surfaces of the dried honeycomb body had checkered patterns by the cells in which the plugging portions were formed in the open end portions and the cells in which the plugging portions were not formed in the open end portions. As a method of forming the plugging portions, first, a sheet was attached to the end surface of the dried honeycomb body, and holes were made at positions of this sheet which corresponded to the cells to be provided with the plugging portions. Next, the end surface of the dried honeycomb body was immersed into a plugging slurry as a slurried forming material of the plugging portions in a state where this sheet was attached as it was, to charge the plugging slurry into the open end portions of the cells which were to be plugged through the holes made in the sheet. Additionally, as the forming material of the plugging portions, the same material as the forming raw material was used.

The plugging slurry charged alternately into the open end portions of the cells in this manner was dried and then this dried honeycomb body was calcinated (degreased) at about 400° C. in the air atmosphere. Afterward, the honeycomb body was fired at about 1450° C. in an Ar inert atmosphere to obtain a honeycomb segment in which values of L, X, Y and (X−Y)/2 shown in FIGS. 6 to 9 were values shown in Table 1 and Table 2, and cell shapes were shown in the same tables. Additionally, all of the obtained honeycomb segments had a shape which was symmetric twice as shown in FIG. 13, and both of values V and W of FIG. 6 were (X−Y)/2. Furthermore, in each of these honeycomb segments, both of the cell shape in the first end surface and the cell shape in the second end surface were rectangular shapes, and a length of each long side of each rectangular shape and a length of each short side thereof had the same values in both end surfaces. Furthermore, thicknesses of partition walls of these honeycomb segments were different between the partition wall parallel to the long side and the partition wall parallel to the short side in each end surface due to an influence of the pressurizing deformation of each formed honeycomb body, and the thickness of the partition wall parallel to the short side was larger than the thickness of the partition wall parallel to the long side. Additionally, the thickness (mm) of each partition wall shown in Table 1 and Table 2 was a value up to two digits after a decimal point, and in these numeric values, any differences were not observed between the thickness of the partition wall parallel to the long side and the thickness of the partition wall parallel to the short side in each end surface. Furthermore, in these honeycomb segments, a porosity was 47%, an average pore diameter was 11 μm, and the influence of the pressurizing deformation of the formed honeycomb body was not seen.

Next, silica fibers, an organic binder and water were added to alumina powder to obtain a slurried bonding material. The bonding material was applied to each side surface of the honeycomb segment in a thickness of about 1 mm, and the plurality of honeycomb segments were assembled so that the side surfaces of the honeycomb segments were bonded to one another by this bonding material. During this assembling, as shown in FIGS. 2 to 4, honeycomb segments were arranged so that in two directions d5 and d6 perpendicular to each other, respective first end surfaces 3 of adjacent honeycomb segments 2a and 2b were directed opposite to each other. Furthermore, the honeycomb segments were arranged so that extending direction of a long side of the first end surface 3 of one honeycomb segment 2a in the adjacent honeycomb segments was parallel to an extending direction of the short side of a second end surface 4 of the other honeycomb segment 2b. Then, the honeycomb segments were dried at 120° C. for two hours while suitably pressing the honeycomb segments to each other, for example, by applying a pressure from the outside, to obtain honeycomb structures. It is to be noted that these honeycomb segments have a shape which is symmetric twice. Furthermore, both of a cell shape in the first end surface and a cell shape in the second end surface are rectangular shapes. A length of each long side of the rectangular shape of one end surface is the same as that of the other end surface, and a length of each short side of the rectangular shape of the one end surface is the same as that of the other end surface. In this case, the first end surfaces of the adjacent honeycomb segments do not have to be directed opposite to each other, and may have the same direction. In this case, the honeycomb segments are arranged so that the extending direction of the long side of the first end surface of one honeycomb segment in the adjacent honeycomb segments is parallel to the extending direction of the short side of the first end surface of the other honeycomb segment.

Next, an outer periphery of each honeycomb structure was subjected to grind processing so that an outer shape of thus honeycomb structure was a columnar shape having a diameter of 230 mm. After the grind processing, an outer periphery coating material of the same composition as in the bonding material was applied to the processed surface of the honeycomb structure in a thickness of 0.6 mm, and dried and hardened at 700° C. for two hours, to form an outer periphery coating layer, whereby the honeycomb structures of Examples 1 to 28 and Comparative Examples 1 to 9 were obtained.

Examples 29 to 33

Honeycomb segments in which dimensions of respective portions and the like had values shown in Table 2 were obtained in the same manner as in Examples 1 to 28 and Comparative Examples 1 to 9, except that as a formed honeycomb body prior to pressurizing deformation, there was used a formed honeycomb body in which when the formed honeycomb body was fired in its shape without performing the pressurizing deformation, a cell shape in each end surface after the firing was a rectangular shape in which a ratio of a length between a long side and a short side was 1.5. Additionally, in these honeycomb segments, a pressurizing direction during the pressurizing deformation of the formed honeycomb body was different between one pair of facing side surfaces and the other pair of facing side surfaces, and hence as shown in Table 2, the ratio of the length between the long side of each cell and the short side thereof was different between the first end surface of each honeycomb segment and the second end surface thereof. Furthermore, in each of the honeycomb segments, a porosity was 47% and an average pore diameter was 11 and an influence due to the pressurizing deformation of each formed honeycomb body was not seen. The obtained honeycomb segments were assembled in the same manner as in Examples 1 to 28 and Comparative Examples 1 to 9, and the grind processing of an outer periphery and formation of an outer periphery coating layer were performed, to obtain honeycomb structures of Examples 29, 30 and 33. Furthermore, honeycomb structures of Examples 31 and 32 were obtained in the same manner as in Examples 29, 30 and 33 except that honeycomb segments were arranged so that first end surfaces of the adjacent honeycomb segments had the same direction and so that an extending direction of each long side of the first end surface of one honeycomb segment in the adjacent honeycomb segments was parallel to an extending direction of each short side of the first end surface of the other honeycomb segment. Additionally, in aftermentioned evaluation, as to the honeycomb structure of Example 31, honeycomb segments constituting the honeycomb structure were arranged so that a first end surface side thereof was an upstream side, and then the evaluation was carried out. Furthermore, as to the honeycomb structure of Example 32, honeycomb segments constituting the honeycomb structure were arranged so that a second end surface side thereof was an upstream side, and then the evaluation was carried out.

Examples 34 to 38

Honeycomb segments in which dimensions of respective portions and the like had values shown in Table 2 were obtained in the same manner as in Examples 1 to 28 and Comparative Examples 1 to 9, except that as a formed honeycomb body prior to pressurizing deformation, there was used a formed honeycomb body in which when the formed honeycomb body was fired in its shape as it was without performing the pressurizing deformation, square cells and octagonal cells having different open areas were alternately arranged in each end surface after the firing, as shown in FIG. 14, and a ratio of the open area between the octagonal cell having a larger open area and the square cell having a smaller open area was 1.8. Additionally, in each of these honeycomb segments, a porosity was 47% and an average pore diameter was 11 μm, and an influence due to the pressurizing deformation of each formed honeycomb body was not seen. The obtained honeycomb segments were assembled in the same manner as in Examples 1 to 28 and Comparative Examples 1 to 9, and the grind processing of an outer periphery and formation of an outer periphery coating layer were performed, to obtain honeycomb structures of Examples 34 to 38.

Comparative Example 10

The Honeycomb Structure as a Reference of the Evaluation

The honeycomb structure of Comparative Example 10 was obtained in the same manner as in Examples 1 to 38 and Comparative Examples 1 to 9 except that pressurizing deformation of each formed honeycomb body was not performed. The pressurizing deformation of the formed honeycomb body was not performed, and hence honeycomb segments constituting the honeycomb structure of Comparative Example 10 had a quadrangular pillar-like outer shape in which both end surfaces had a congruent square shape, and axial directions of all cells were the same as those of the honeycomb segments. Additionally, in the honeycomb segments, a thickness of partition walls was 0.13 mm, a cell density was 70 cells/cm$^2$, a porosity was 47%, and an average pore diameter was 11 μm. Furthermore, in the honeycomb segments, a length (the whole length) of each honeycomb segment and a length of each side of each end surface having a square shape were the same values as a length L of each honeycomb segment and a length X of each long side of each end surface having a rectangular shape in the honeycomb segment used in each of Examples 1 to 38 and Comparative Examples 1 to 9, respectively. That is, Comparative Example 10 is not a single honeycomb structure, but includes a plurality of honeycomb structures constituted by using quadrangular pillar-like honeycomb segments in which the whole length of each honeycomb segment and a length of each side of each end surface of the honeycomb segment are the same as L and X of each honeycomb segment constituting each of the honeycomb structures of Examples 1 to 38 and Comparative Examples 1 to 9, respectively. Furthermore, this honeycomb structure of Comparative Example 10 is a honeycomb structure as a reference of the evaluation in after-mentioned "heating vibration test", "pressure loss" and "the number of discharged PM particles". That is, when the honeycomb structures of Examples 1 to 38 and Comparative Examples 1 to 9 are evaluated, the honeycomb structure of Comparative Example 10 having a columnar outer shape with a diameter of 230 mm and constituted by using the quadrangular pillar-like honeycomb segments is the reference of the evaluation, in which the whole length of each honeycomb segment and a length of each side of each end surface of the honeycomb segment are the same values as L and X of each honeycomb segment constituting each honeycomb structure as an evaluation object, respectively.

As to each of the honeycomb structures of Examples 1 to 38 and Comparative Examples 1 to 10, the heating vibration test, the measurement of the pressure loss and the measurement of the number of the discharged PM particles were carried out by methods described in the following. Then, on the basis of the test results or the measurement results, the evaluation was carried out in four stages of A, B, C and D, and the evaluation results are shown in Tables 3 to 4.

[Heating Vibration Test]

A ceramic non-intumescent mat was wound around an outer periphery of each honeycomb structure, the honeycomb structure was pushed into a canning member made of stainless steel (SUS430) to obtain a canned structure, and then the heating vibration test was carried out. Test conditions were set to an inlet gas temperature of 950° C., a vibration acceleration of 50 G and a vibration frequency of 200 Hz, and the vibration was applied in an axial direction of the honeycomb structure while allowing a heated exhaust gas to flow into the canned structure continuously for 200 hours. Evaluation standards of this test are as follow.

A: After the heating vibration test, any movement is not observed in any honeycomb segment of the honeycomb structure removed by disassembling the can member, and even when the periphery of the honeycomb structure is strongly pushed by hand with a force of about 5 kg, any honeycomb segment does not move.

B: After the heating vibration test, any movement is not observed in any honeycomb segment of the honeycomb structure removed by disassembling the canning member, but when the periphery of the honeycomb structure is strongly pushed by hand with the force of about 5 kg, the honeycomb segments move.

C: After the heating vibration test, the movement is observed in at least one honeycomb segment of the honeycomb structure, but a movement amount of the honeycomb segment which moves most is 0.5 mm or less.

D: After the heating vibration test, the movement is observed in at least one honeycomb segment of the honeycomb structure, and the movement amount of the honeycomb segment which moves most exceeds 0.5 mm.

It is to be noted that in the honeycomb structures of the evaluation results A to C in the evaluation of this heating vibration test, the movement of the honeycomb segments due to vibration or exhaust pressure can effectively be suppressed, and it can be considered that there are not any problems in usual use as a filter. On the other hand, in the honeycomb structure of the evaluation result D, the movement of the honeycomb segments due to the vibration or the exhaust pressure cannot sufficiently be suppressed, and there is the possibility that a problem occurs in the usual use as the filter.

[Pressure Loss]

In each honeycomb structure, air of an atmospheric pressure (1 atm) and room temperature (20° C.) was allowed to flow at 14 m$^3$/minute, thereby measuring the pressure loss. On the basis of this measurement result, the pressure loss was evaluated. Evaluation standards are as follows.

A: A relative pressure loss is 102% or less, when the pressure loss of the honeycomb structure of Comparative Example 10 is taken as 100%.

B: The relative pressure loss exceeds 102% and 104% or less, when the pressure loss of the honeycomb structure of Comparative Example 10 is taken as 100%.

C: The relative pressure loss exceeds 104% and 106% or less, when the pressure loss of the honeycomb structure of Comparative Example 10 is taken as 100%.

D: The relative pressure loss exceeds 106%, when the pressure loss of the honeycomb structure of Comparative Example 10 is taken as 100%.

It is to be noted that in the honeycomb structures of the evaluation results A to C in the evaluation of this pressure loss, an engine performance is influenced less, and there are not any problems in the usual use as the filter. On the other hand, in the honeycomb structure of the evaluation result D, the pressure loss is high to such an extent that the influence on the engine performance is not negligible, and the honeycomb structure is not suitable for the use as the filter.

[Number of Discharged PM Particles]

A ceramic non-intumescent mat was wound around an outer periphery of each honeycomb structure, the honeycomb structure was pushed into a canning member made of stainless steel to obtain a canned structure, and then the structure was disposed on an outlet side of an engine exhaust manifold of a 4-cylinders diesel engine car of a displacement of 2.0 L. Furthermore, when this diesel engine car was run in a new European driving cycle (NEDC) mode on a chassis dynamo, the number of the discharged PM particles (particles/km) was measured. On the basis of this measurement result, the evaluation of the number of the discharged PM particles was performed. Evaluation standards are as follows.

A: As compared with the number of the discharged PM particles of the honeycomb structure of Comparative Example 10, the number of the discharged PM particles decreases as much as 30% or more.

B: As compared with the number of the discharged PM particles of the honeycomb structure of Comparative Example 10, the number of the discharged PM particles decreases in a range of 10% or more and smaller than 30%.

C: As compared with the number of the discharged PM particles of the honeycomb structure of Comparative Example 10, the number of the discharged PM particles is equal or only decreases less than 10%.

D: As compared with the number of the discharged PM particles of the honeycomb structure of Comparative Example 10, the number of the discharged PM particles increases.

It is to be noted that in the honeycomb structures of the evaluation results A to C in the evaluation of this number of the discharged PM particles, a PM collecting performance is suitable, and there are not any problems in the usual use as the filter. On the other hand, in the honeycomb structure of the evaluation result D, the PM collecting performance is low, and the honeycomb structure is not suitable for the use as the filter.

TABLE 1

| | Dimension (mm) of honeycomb segment | | | | Cell density in end surface | Ratio of length between long side and short side of cell in end surface | | Thickness of partition wall in end surface (mm) | | | |
| | | | | | | | | Partition wall parallel to long side | Partition wall parallel to short side | Partition wall parallel to long side | Partition wall parallel to short side |
| | L | X | Y | (X − Y)/2 | Cell shape | (cells/cm$^2$) | First end surface | Second end surface | of first end surface | of first end surface | of second end surface | of second end surface |
|---|---|---|---|---|---|---|---|---|---|---|---|---|
| Example 1 | 150 | 35 | 34.6 | 0.2 | A shape of | 70.8 | 1.01 | 1.01 | 0.13 | 0.13 | 0.13 | 0.13 |
| Example 2 | 150 | 35 | 34.4 | 0.3 | all cells in | 71.2 | 1.02 | 1.02 | 0.13 | 0.13 | 0.13 | 0.13 |
| Example 3 | 150 | 35 | 34 | 0.5 | both end | 72.1 | 1.03 | 1.03 | 0.13 | 0.13 | 0.13 | 0.13 |
| Example 4 | 150 | 35 | 33 | 1 | surfaces is a | 74.2 | 1.06 | 1.06 | 0.13 | 0.14 | 0.13 | 0.14 |
| Example 5 | 150 | 35 | 29 | 3 | rectangular | 84.5 | 1.21 | 1.21 | 0.13 | 0.16 | 0.13 | 0.16 |
| Example 6 | 150 | 35 | 25 | 5 | shape. | 98.0 | 1.40 | 1.40 | 0.13 | 0.18 | 0.13 | 0.18 |
| Example 7 | 150 | 35 | 22 | 6.5 | | 111.4 | 1.59 | 1.59 | 0.13 | 0.21 | 0.13 | 0.21 |
| Example 8 | 150 | 35 | 21.4 | 6.8 | | 114.5 | 1.64 | 1.64 | 0.13 | 0.21 | 0.13 | 0.21 |
| Example 9 | 150 | 35 | 21 | 7 | | 116.7 | 1.67 | 1.67 | 0.13 | 0.22 | 0.13 | 0.22 |
| Example 10 | 150 | 50 | 49.6 | 0.2 | | 70.6 | 1.01 | 1.01 | 0.13 | 0.13 | 0.13 | 0.13 |
| Example 11 | 150 | 50 | 49.4 | 0.3 | | 70.9 | 1.01 | 1.01 | 0.13 | 0.13 | 0.13 | 0.13 |
| Example 12 | 150 | 50 | 49 | 0.5 | | 71.4 | 1.02 | 1.02 | 0.13 | 0.13 | 0.13 | 0.13 |
| Example 13 | 150 | 50 | 48 | 1 | | 72.9 | 1.04 | 1.04 | 0.13 | 0.14 | 0.13 | 0.14 |
| Example 14 | 150 | 50 | 44 | 3 | | 79.5 | 1.14 | 1.14 | 0.13 | 0.15 | 0.13 | 0.15 |
| Example 15 | 150 | 50 | 40 | 5 | | 87.5 | 1.25 | 1.25 | 0.13 | 0.16 | 0.13 | 0.16 |
| Example 16 | 150 | 50 | 37 | 6.5 | | 94.6 | 1.35 | 1.35 | 0.13 | 0.18 | 0.13 | 0.18 |
| Example 17 | 150 | 50 | 36.4 | 6.8 | | 96.2 | 1.37 | 1.37 | 0.13 | 0.18 | 0.13 | 0.18 |
| Example 18 | 150 | 50 | 36 | 7 | | 97.2 | 1.39 | 1.39 | 0.13 | 0.18 | 0.13 | 0.18 |
| Example 19 | 300 | 35 | 34.6 | 0.2 | | 70.8 | 1.01 | 1.01 | 0.13 | 0.13 | 0.13 | 0.13 |
| Example 20 | 300 | 35 | 34 | 0.5 | | 72.1 | 1.03 | 1.03 | 0.13 | 0.13 | 0.13 | 0.13 |
| Example 21 | 300 | 35 | 28 | 3.5 | | 87.5 | 1.25 | 1.25 | 0.13 | 0.16 | 0.13 | 0.16 |
| Example 22 | 300 | 35 | 22 | 6.5 | | 111.4 | 1.59 | 1.59 | 0.13 | 0.21 | 0.13 | 0.21 |
| Example 23 | 300 | 35 | 21 | 7 | | 116.7 | 1.67 | 1.67 | 0.13 | 0.22 | 0.13 | 0.22 |
| Example 24 | 300 | 50 | 49.6 | 0.2 | | 70.6 | 1.01 | 1.01 | 0.13 | 0.13 | 0.13 | 0.13 |

TABLE 2

| | Dimension (mm) of honeycomb segment | | | | Cell density in end surface | Ratio of length between long side and short side of cell in end surface | | Thickness of partition wall in end surface (mm) | | | |
| | | | | | | | | Partition wall parallel to long side | Partition wall parallel to short side | Partition wall parallel to long side | Partition wall parallel to short side |
| | L | X | Y | (X − Y)/2 | Cell shape | (cells/cm$^2$) | First end surface | Second end surface | of first end surface | of first end surface | of second end surface | of second end surface |
|---|---|---|---|---|---|---|---|---|---|---|---|---|
| Example 25 | 300 | 50 | 49 | 0.5 | A shape of all | 71.4 | 1.02 | 1.02 | 0.13 | 0.13 | 0.13 | 0.13 |
| Example 26 | 300 | 50 | 43 | 3.5 | cells in both end | 81.4 | 1.16 | 1.16 | 0.13 | 0.15 | 0.13 | 0.15 |
| Example 27 | 300 | 50 | 37 | 6.5 | surfaces is a | 94.6 | 1.35 | 1.35 | 0.13 | 0.18 | 0.13 | 0.18 |
| Example 28 | 300 | 50 | 36 | 7 | rectangular shape. | 97.2 | 1.39 | 1.39 | 0.13 | 0.18 | 0.13 | 0.18 |
| Example 29 | 150 | 35 | 34.6 | 0.2 | A shape of all | 70.8 | 1.52 | 1.48 | 0.13 | 0.13 | 0.13 | 0.13 |
| Example 30 | 150 | 35 | 33 | 1 | cells in both end | 74.2 | 1.59 | 1.41 | 0.13 | 0.14 | 0.13 | 0.14 |

TABLE 2-continued

| | Dimension (mm) of honeycomb segment | | | | Cell shape | Cell density in end surface (cells/cm²) | Ratio of length between long side and short side of cell in end surface | | Thickness of partition wall in end surface (mm) | | | |
|---|---|---|---|---|---|---|---|---|---|---|---|---|
| | L | X | Y | (X − Y)/2 | | | First end surface | Second end surface | Partition wall parallel to long side of first end surface | Partition wall parallel to short side of first end surface | Partition wall parallel to long side of second end surface | Partition wall parallel to short side of second end surface |
| Example 31 | 150 | 35 | 28 | 3.5 | surfaces is a rectangular shape (however, a ratio of a length between a long side of a cell and a short side thereof is different between a first end surface and a second end surface). | 87.5 | 1.88 | 1.20 | 0.13 | 0.16 | 0.13 | 0.16 |
| Example 32 | 150 | 35 | 23 | 6 | | 106.5 | 2.28 | 0.99 | 0.13 | 0.20 | 0.13 | 0.20 |
| Example 33 | 150 | 35 | 21 | 7 | | 116.7 | 2.50 | 0.90 | 0.13 | 0.22 | 0.13 | 0.22 |
| Example 34 | 150 | 35 | 34.6 | 0.2 | Square cells and octagonal cells are alternately arranged in both end surfaces. | 70.8 | — | — | — | — | — | — |
| Example 35 | 150 | 35 | 33 | 1 | | 74.2 | — | — | — | — | — | — |
| Example 36 | 150 | 35 | 28 | 3.5 | | 87.5 | — | — | — | — | — | — |
| Example 37 | 150 | 35 | 23 | 6 | | 106.5 | — | — | — | — | — | — |
| Example 38 | 150 | 35 | 21 | 7 | | 116.7 | — | — | — | — | — | — |
| Comparative Example 1 | 150 | 35 | 34.8 | 0.1 | A shape of all cells in both end surfaces is a rectangular shape. | 70.4 | 1.01 | 1.01 | 0.13 | 0.13 | 0.13 | 0.13 |
| Comparative Example 2 | 150 | 35 | 34.7 | 0.15 | | 70.6 | 1.01 | 1.01 | 0.13 | 0.13 | 0.13 | 0.13 |
| Comparative Example 3 | 150 | 35 | 20.6 | 7.2 | | 118.9 | 1.70 | 1.70 | 0.13 | 0.22 | 0.13 | 0.22 |
| Comparative Example 4 | 150 | 35 | 19 | 8 | | 128.9 | 1.84 | 1.84 | 0.13 | 0.24 | 0.13 | 0.24 |
| Comparative Example 5 | 150 | 50 | 49.7 | 0.15 | | 70.4 | 1.01 | 1.01 | 0.13 | 0.13 | 0.13 | 0.13 |
| Comparative Example 6 | 150 | 50 | 35.4 | 7.3 | | 98.9 | 1.41 | 1.41 | 0.13 | 0.18 | 0.13 | 0.18 |
| Comparative Example 7 | 150 | 50 | 34 | 8 | | 102.9 | 1.47 | 1.47 | 0.13 | 0.19 | 0.13 | 0.19 |
| Comparative Example 8 | 300 | 50 | 49.7 | 0.15 | | 70.4 | 1.01 | 1.01 | 0.13 | 0.13 | 0.13 | 0.13 |
| Comparative Example 9 | 300 | 50 | 35 | 7.5 | | 100 | 1.43 | 1.43 | 0.13 | 0.19 | 0.13 | 0.19 |
| Comparative Example 10 | 150 or 300 | 35 or 50 | 35 or 50 | 0 | In both end surfaces, a shape of all cells is a square or rectangular shape, or the square cells and octagonal cells are alternately arranged. | 70 | — | — | 0.13 | 0.13 | 0.13 | 0.13 |

TABLE 3

| | Evaluation result | | |
|---|---|---|---|
| | Heating vibration test | Pressure loss | No. of discharged PM particles |
| Example 1 | C | A | C |
| Example 2 | C | A | C |
| Example 3 | B | A | B |
| Example 4 | A | A | B |
| Example 5 | A | A | A |
| Example 6 | A | B | A |
| Example 7 | A | C | A |
| Example 8 | A | C | A |
| Example 9 | A | C | A |
| Example 10 | C | A | C |
| Example 11 | C | A | C |
| Example 12 | B | A | B |
| Example 13 | A | A | B |
| Example 14 | A | A | A |
| Example 15 | A | B | A |
| Example 16 | A | C | A |
| Example 17 | A | C | A |
| Example 18 | A | C | A |
| Example 19 | C | A | C |
| Example 20 | B | A | B |
| Example 21 | A | A | A |
| Example 22 | A | C | A |
| Example 23 | A | C | A |
| Example 24 | C | A | C |

TABLE 4

| | Evaluation result | | |
|---|---|---|---|
| | Heating vibration test | Pressure loss | No. of discharged PM particles |
| Example 25 | B | A | B |
| Example 26 | A | A | A |
| Example 27 | A | C | A |
| Example 28 | A | C | A |
| Example 29 | C | A | C |
| Example 30 | A | A | B |
| Example 31 | A | A | A |
| Example 32 | A | B | A |
| Example 33 | A | C | A |
| Example 34 | C | A | C |
| Example 35 | A | A | B |
| Example 36 | A | A | A |
| Example 37 | A | B | A |
| Example 38 | A | C | A |
| Comparative Example 1 | D | A | D |
| Comparative Example 2 | D | A | C |
| Comparative Example 3 | A | D | A |
| Comparative Example 4 | A | D | A |
| Comparative Example 5 | D | A | C |
| Comparative Example 6 | A | D | A |
| Comparative Example 7 | A | D | A |
| Comparative Example 8 | D | A | C |
| Comparative Example 9 | A | D | A |
| Comparative Example 10 | — | — | — |

(Discussion)

As shown in Table 3 and Table 4, in the honeycomb structures of Examples 1 to 38 as the examples of the present invention, the movement of the honeycomb segments due to the vibration or the exhaust pressure is effectively suppressed, and there are not any problems of the pressure loss or the PM collecting performance during the usual use as the filter. On the other hand, in the honeycomb structures of Comparative Examples 1, 2, 5 and 8 in which the honeycomb segments of (X−Y)/2 having a value smaller than 0.2 mm are used, the movement of the honeycomb segments due to the vibration or the exhaust pressure cannot sufficiently be suppressed, and there is the possibility that the problem occurs in the usual use as the filter. Furthermore, in the honeycomb structure of Comparative Example 1 in which the honeycomb segments of (X−Y)/2 having the smallest value of 0.1 mm are used, the movement of the honeycomb segments due to the vibration or the exhaust pressure cannot sufficiently be suppressed. Additionally, the PM collecting performance is low, and the honeycomb structure is not suitable for the use as the filter. Furthermore, in the honeycomb structures of Comparative Examples 3, 4, 6, 7 and 9 in which honeycomb segments of (X−Y)/2 having a value in excess of 7 mm are used, the pressure loss is large to such an extent that the influence on the engine performance is not negligible, and the honeycomb structures are not suitable for the use as the filter.

The present invention can suitably be used in a filter or the like to collect particulate materials included in an exhaust gas of a diesel engine or a gasoline engine.

DESCRIPTION OF REFERENCE SYMBOLS

1: honeycomb structure, 2: honeycomb segment, 3: first end surface, 4: second end surface, 5: pair of first tapered side surfaces, 6: pair of second tapered side surfaces, 7: cell, 8: partition wall, 9: bonding material, 10: outer periphery coating layer, 12: plugging portion, 13: inlet end surface, 14: outlet end surface, and 15: axis.

What is claimed is:

1. A honeycomb structure in which a plurality of honeycomb segments are integrally bonded via a bonding material, each of the honeycomb segments having a first end surface, a second end surface, porous partition walls to define and form a plurality of cells extending from the first end surface to the second end surface, and an outer peripheral surface connecting the first end surface to the second end surface, wherein as to each of the honeycomb segments other than the honeycomb segments positioned in the outermost periphery of the honeycomb structure among the plurality of honeycomb segments, the first end surface and the second end surface of the honeycomb segment have rectangular shapes having the same dimensions, and are in a positional relation in which extending directions of long sides of the respective end surfaces are perpendicular to each other when the first end surface is viewed from a direction perpendicular thereto, (X−Y)/2 is from 0.2 to 7 mm, where X is a length of each long side of each of the first end surface and the second end surface having the same dimensions, and Y is a length of each short side of each of the first end surface and the second end surface having the same dimensions, the outer peripheral surface comprises four side surfaces, the four side surfaces are constituted of a pair of first tapered side surfaces including two side surfaces opposing each other so that a distance between the side surfaces becomes narrow from the side of the first end surface toward the side of the second end surface, and a pair of second tapered side surfaces including two side surfaces opposing, each other so that a distance between the side surfaces becomes narrow from the second end surface side toward the first end surface side, and in two directions perpendicular to each other on each end surface of the honeycomb structure, the respective first end surfaces of a pair of adjacent honeycomb segments are directed opposite to each other, and the extending direction of the long side of the first end surface of one honeycomb segment in the pair of adjacent honeycomb segments is parallel to an extending direction of the short side of the second end surface of the other honeycomb segment in the pair of adjacent honeycomb segments.

2. The honeycomb structure according to claim 1, wherein the honeycomb segment has a shape which is symmetric in the extending direction of the long side of the first end surface and in the extending direction of the long side of the second end surface, about an axis passing an intersection of two diagonal lines of the first end surface having the rectangular shape and an intersection of two diagonal lines of the second end surface similarly having the rectangular shape.

3. The honeycomb structure according to claim 2, wherein the honeycomb segment has plugging portions to plug open end portions on the first end surface side of predetermined cells and open end portions on the second end surface side of the remaining cells.

4. The honeycomb structure according to claim 1, wherein the honeycomb segment has plugging portions to plug open end portions on the first end surface side of predetermined cells and open end portions on the second end surface side of the remaining cells.

5. The honeycomb structure according to claim 1, wherein both of a shape of the cells in the first end surface and a shape of the cells in the second end surface are rectangular shapes.

6. The honeycomb structure according to claim 1, wherein a shape of the cells in one of the first end surface and the second end surface is a square shape, and a shape of the cells in the other end surface is a rectangular shape.

7. The honeycomb structure according to claim 1, wherein in the first end surface and the second end surface, two types of cells having different areas are alternately arranged.

8. The honeycomb structure according claim 1, wherein the honeycomb segments are integrally bonded via the bonding material, and then subjected to outer periphery grind processing, so that an outer periphery coating layer is formed on a processed surface thereof.

9. A honeycomb structure in which a plurality of honeycomb segments are integrally bonded via a bonding material, each of the honeycomb segments having a first end surface, a second end surface, porous partition walls to define and form a plurality of cells extending from the first end surface to the second end surface, and an outer peripheral surface connecting the first end surface to the second end surface, wherein as to each of the honeycomb segments other than the honeycomb segments positioned in the outermost periphery of the honeycomb structure among the plurality of honeycomb segments, the first end surface and the second end surface have rectangular shapes having the same dimensions, and are in a positional relation in which extending directions of long sides of the respective end surfaces are perpendicular to each other when the first end surface is viewed from a direction perpendicular thereto, $(X-Y)/2$ is from 0.2 to 7 mm, where X is a length of each long side of each of the first end surface and the second end surface having the same dimensions, and Y is a length of each short side of each of the first end surface and the second end surface having the same dimensions, the outer peripheral surface comprises four side surfaces, the four side surfaces are constituted of a pair of first tapered side surfaces including two side surfaces opposing each other so that a distance between the side surfaces becomes narrow from the side of the first end surface toward the side of the second end surface, and a pair of second tapered side surfaces including two side surfaces opposing each other so that a distance between the side surfaces becomes narrow from the second end surface side toward the first end surface side, the honeycomb segment has a shape which is symmetric in the extending direction of the long side of the first end surface and in the extending direction of the long side of the second end surface, about an axis passing an intersection of two diagonal lines of the first end surface having the rectangular shape and an intersection of two diagonal lines of the second end surface similarly having the rectangular shape, and in two directions perpendicular to each other on each end surface of the honeycomb structure, the respective first end surfaces of a pair of adjacent honeycomb segments have the same direction, and the extending direction of the long side of the first end surface of one honeycomb segment in the pair of adjacent honeycomb segments is parallel to an extending direction of the short side of the first end surface of the other honeycomb segment in the pair of adjacent honeycomb segments.

10. The honeycomb structure according to claim 9, wherein the honeycomb segment has plugging portions to plug open end portions on the first end surface side of predetermined cells and open end portions on the second end surface side of the remaining cells.

11. The honeycomb structure according to claim 9, wherein both of a shape of the cells in the first end surface and a shape of the cells in the second end surface are rectangular shapes.

12. The honeycomb structure according to claim 9, wherein a shape of the cells in one of the first end surface and the second end surface is a square shape, and a shape of the cells in the other end surface is a rectangular shape.

13. The honeycomb structure according to claim 9, wherein in the first end surface and the second end surface, two types of cells having different areas are alternately arranged.

14. The honeycomb structure according to claim 9, wherein the honeycomb segments are integrally bonded via the bonding material, and then subjected to outer periphery grind processing, so that an outer periphery coating layer is formed on a processed surface thereof.

* * * * *